US008331071B2

(12) United States Patent
Benedict et al.

(10) Patent No.: US 8,331,071 B2
(45) Date of Patent: Dec. 11, 2012

(54) INTERCONNECTION SWITCHING SYSTEM AND METHOD FOR CONNECTING A DISTRIBUTED ENERGY RESOURCE TO AN ELECTRICAL POWER SYSTEM (75) Inventors: Eric L. Benedict, Middlesex, VT (US); Vinod John, Bangalore (IN)

(73) Assignee: Northern Power Systems Utility Scale, Inc., Barre, VT (US)

( * ) Notice: Subject to any disclaimer, the term of this patent is extended or adjusted under 35 U.S.C. 154(b) by 852 days.

(21) Appl. No.: 12/483,546

(22) Filed: Jun. 12, 2009

(65) Prior Publication Data

US 2010/0314936 A1 Dec. 16, 2010

(51) Int. Cl.
*H02J 4/00* (2006.01)
(52) U.S. Cl. ....................................... 361/93.9
(58) Field of Classification Search ............... 361/93.9
See application file for complete search history.

(56) References Cited

U.S. PATENT DOCUMENTS

| | | | |
|---|---|---|---|
| 4,873,601 A | 10/1989 | Wakasa | |
| 5,604,423 A | 2/1997 | Degeneff et al. | |
| 5,841,618 A | 11/1998 | Dilkes et al. | |
| 5,892,645 A | 4/1999 | Watanabe et al. | |
| 6,483,682 B1 | 11/2002 | Reynolds | |
| 6,630,816 B2 | 10/2003 | Kotani et al. | |
| 6,972,972 B2 * | 12/2005 | Duncan et al. | 363/56.01 |
| 7,034,499 B2 | 4/2006 | Kerlin, IV et al. | |
| 7,091,703 B2 | 8/2006 | Folts et al. | |
| 7,773,360 B2 * | 8/2010 | O'Leary et al. | 361/104 |
| 2001/0026427 A1 | 10/2001 | Mahlein et al. | |
| 2003/0063421 A1 | 4/2003 | Smith et al. | |
| 2003/0107875 A1 | 6/2003 | Bijlenga et al. | |
| 2003/0222513 A1 | 12/2003 | Kuribayashi | |
| 2003/0230937 A1 | 12/2003 | McEachern et al. | |
| 2004/0264082 A1 | 12/2004 | Suliman et al. | |
| 2005/0073200 A1 | 4/2005 | Divan et al. | |
| 2006/0203409 A1 | 9/2006 | Grisoni | |
| 2007/0213956 A1 | 9/2007 | Nasle et al. | |
| 2008/0203826 A1 | 8/2008 | Chung | |
| 2008/0204961 A1 | 8/2008 | O'Leary et al. | |

* cited by examiner

*Primary Examiner* — Jared Fureman
*Assistant Examiner* — Nicholas Ieva
(74) *Attorney, Agent, or Firm* — Downs Rachlin Martin PLLC (57) ABSTRACT

A distributed energy resource (DER) switching system and method for connecting a DER to an electrical power system (EPS) protector, wherein the DER has a reactance-to-resistance ratio higher than the reactance-to-resistance ratio of the EPS protector. The DER switching system includes an input for receiving power from the DER, and an output for providing power from the DER to the EPS protector. The DER switching system is designed to effectively lower the higher reactance-to-resistance ratio of the DER during an over-current fault so that, during the fault, the effective reactance-to-resistance ratio at the output of the DER switching system is lower than the reactance-to-resistance ratio of the EPS protector. The method includes effectively lowering the reactance-to-resistance ratio of the DER by varying the operating state of a switching device in a controlled manner during the fault.

35 Claims, 3 Drawing Sheets

INTERCONNECTION SWITCHING SYSTEM AND METHOD FOR CONNECTING A DISTRIBUTED ENERGY RESOURCE TO AN ELECTRICAL POWER SYSTEM

FIELD OF THE INVENTION

The present invention generally relates to the field of electrical power systems. In particular, the present invention is directed to an interconnection switching system and method for connecting a distributed energy resource to an electrical power system.

BACKGROUND

Distributed energy resources (DERs) play an ever-increasing role in electrical power generation. Generally, a DER is a relatively low-power (relative to traditional utility-scale fossil fuel, hydroelectric and nuclear power plants) electricity-generating or—storage device that is connected to an electrical power system (EPS), for example, a utility power grid, to form a distributed energy system. Examples of DERs include diesel engine-generator sets, wind turbines, solar cells, fuel cells, backup batteries, and any combination of these. DERs are used for a number of reasons. For example, in some applications DERs are used to provide backup power when primary power from a utility grid is interrupted. In other applications DERs are used to reduce reliance on electrical power from a utility power grid. In still further applications, DERs are used to supplement power provided by conventional electrical power generators, such as fossil-fuel-fired and nuclear-fission driven power plants. DERs are becoming increasingly popular as more manufacturers are building DERs that generate electricity from renewable resources, such as wind and solar energy.

Regardless of the rise in popularity of DERs, an important requirement is that the connection of any given DER to an EPS does not significantly impact the quality of the electrical power on the EPS. Consequently, the proliferation of DERs into EPSs is greatly dependent on the quality of the interconnection equipment (which includes any software) used to connect DERs to EPSs. Interconnection equipment typically performs a number of functions as between a DER and the corresponding EPS, including, as necessary, voltage regulation, grounding integration, synchronization, power conversion, monitoring, isolation, voltage disturbance handling, frequency disturbance handling, harmonics handling, current disturbance handling, fault handling, etc. It can be challenging for interconnection equipment designers to design equipment that performs all of the needed functionality, while minimizing the complexity and cost of the equipment.

SUMMARY OF THE DISCLOSURE

In one implementation, the present disclosure is directed to an interconnection device for connecting a distributed energy resource (DER) having a first reactance-to-resistance ratio (X/R) to an electrical power system (EPS) via an EPS protector having a second X/R lower than the first X/R. The interconnection device includes: a DER switch that includes: an input for receiving power from the DER when the interconnection device is installed between the DER and the EPS protector and the DER is operating; an output for providing, when the DER switch is closed, the DER is operating, and the interconnection device is installed between the DER and the EPS protector, the power to the EPS protector; and a switching device electrically connected between the input and the output, the switching device responsive to, when the interconnection device is installed between the DER and the EPS, an over-current from the DER so as to provide at the output a third X/R that is no greater than the second X/R.

In another implementation, the present disclosure is directed to a system. The system includes: a distributed energy resource (DER) having a first reactance-to-resistance ratio (X/R); an electrical power system that includes a power protector having a second X/R smaller than the first X/R; a DER switch that includes: an input for receiving power from the DER; an output for providing the power to the power protector; and a switching device electrically connected between the input and the output, the switching device responsive to an over-current from the DER so as to provide at the output a third X/R that is no greater than the second X/R.

In still another implementation, the present disclosure is directed to a method of controlling electrical power provided by a distributed energy resource (DER) to an electrical power system, wherein the DER has a first reactance-to-resistance ratio (X/R) and the power protector has a second X/R less than the first X/R. The method includes: receiving electrical current from the DER; while the electrical current is in a non-over-current condition, passing substantially all of the electrical current to the electrical power system; and when the electrical current is in an over-current condition, effectively reducing, at a location between the DER and the electrical power system, the first X/R to a non-zero value no greater than the second X/R.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
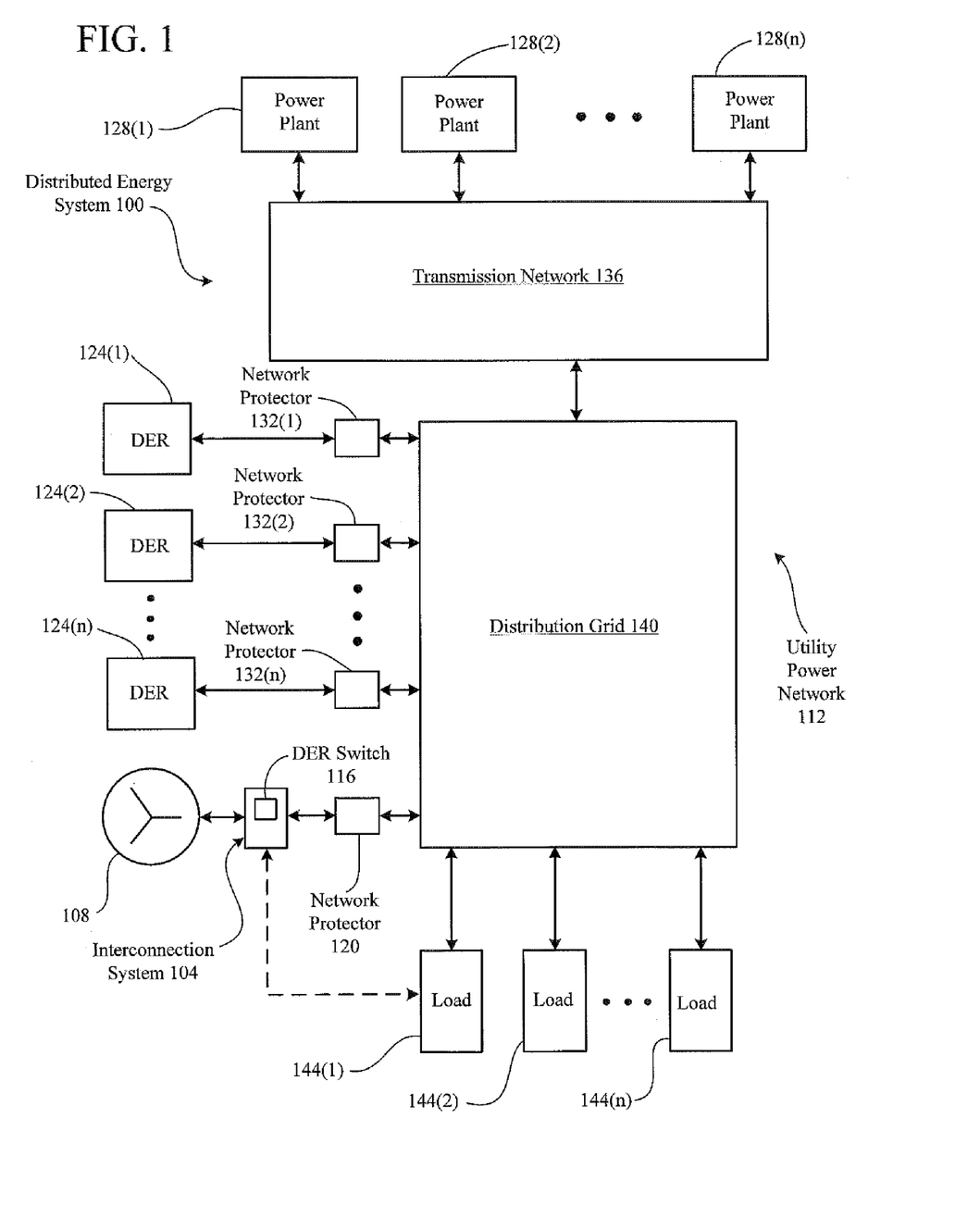
FIG. 1 is a high-level block/schematic diagram of a distributed energy system that includes a distributed energy resource (DER) switch made in accordance with broad concepts of the present disclosure.

Referring now to the drawings, FIG. 1 illustrates an example distributed energy system 100 that includes electrical interconnection system 104 that embodies broad concepts of the present disclosure. Interconnection system 104 is useful, for example, in connecting a distributed energy resource (DER), such as synchronous electrical power generator 108, to an electrical power system (EPS), here a utility power network 112. As described below in more detail, interconnection system 104 includes a specially designed DER switch 116 that is especially useful where the DER has a reactance-to-resistance ratio (X/R) greater than the X/R of the EPS to which it is being connected. The higher X/R of the DER creates an opportunity for large fault currents, or over-currents, to flow from the DER to the EPS. This can be problematic for a number of reasons. For example, where the EPS includes a power protector, such as network protector 120, the large over-current from the DER can blow the power protector. An interconnection system that incorporates a DER switch of the present disclosure, however, inhibits excessive over-currents on the DER side of the interconnection system from reaching the power protector by effectively reducing the X/R of the DER to a value no greater than the X/R of the EPS. Examples of how a DER switch of the present disclosure, such as DER switch 116, can accomplish this effective lowering of the X/R of the DER are described below.

Before proceeding with describing details of the specially designed DER switches that incorporate concepts of the present disclosure, further contextual information regarding example DER switch 116 is first provided. In the example of FIG. 1, generator 108, interconnection system 104, utility power network 112 and network protector 120 are part of overall distributed energy system 100, so called because it contains multiple electrical power sources, here generator 108, a number of additional small scale DERs 124(1)-124(n) and a number of power plants 128(1)-128(n). Here, DERs 124(1)-124(n) are electrically connected to utility power network 112 via corresponding respective network protectors 132(1)-132(n). It is noted that in this example additional DERs 124(1)-124(n) are of the type having X/Rs lower than or at most equal to the X/R of utility power network 112. DERs with intermittent energy sources, such as wind, may include battery systems in which the battery system(s) are connected between the network protector and any rotating-machine-type generator that may be present in the DER.

Utility power network 112 includes one or more transmission networks (one transmission network, network 136, is shown here for simplicity) and one or more distribution grids (one distribution grid, grid 140, is likewise shown here for simplicity). Generally, each transmission network 136 transmits electrical power from one or more of power plants 128 (1)-128(n) over relatively long distances to one or more distribution grids 140. Each distribution grid 140 distributes electrical power from the corresponding transmission network(s) 136 to electrical loads 144(1)-144(n) connected to that distribution network. Typical loads that any one of loads 144(1)-144(n) may be include AC and/or DC loads in homes, condominiums, apartment buildings, office buildings, shopping malls, residential areas, manufacturing facilities, research and development facilities, recreational areas and complexes, office parks, and university and college campuses, among many others.

While in this example DER switch 116 is part of a wide-area distributed energy system, it should be understood that it may be part of another electrical power system (not shown) and still provide its benefits. Moreover, in other examples synchronous generator 108 can be replaced by multiple synchronous generators and/or one or more other DERs having individual X/Rs or a combined X/R greater than the X/R of the EPS to which the DER(s) is/are connected via a DER switch incorporating broad concepts of the present disclosure, such as DER switch 116. In addition to the functionality described above, interconnection system 104 can, but need not necessarily, include, for example, any one or more of the following functionalities: power conversion; power conditioning; local protective relaying; transfer switching; switchgear paralleling; electrical metering at the wide-area EPS side of the interconnection device; and DER control, monitoring and metering, among other.

Figure 2:
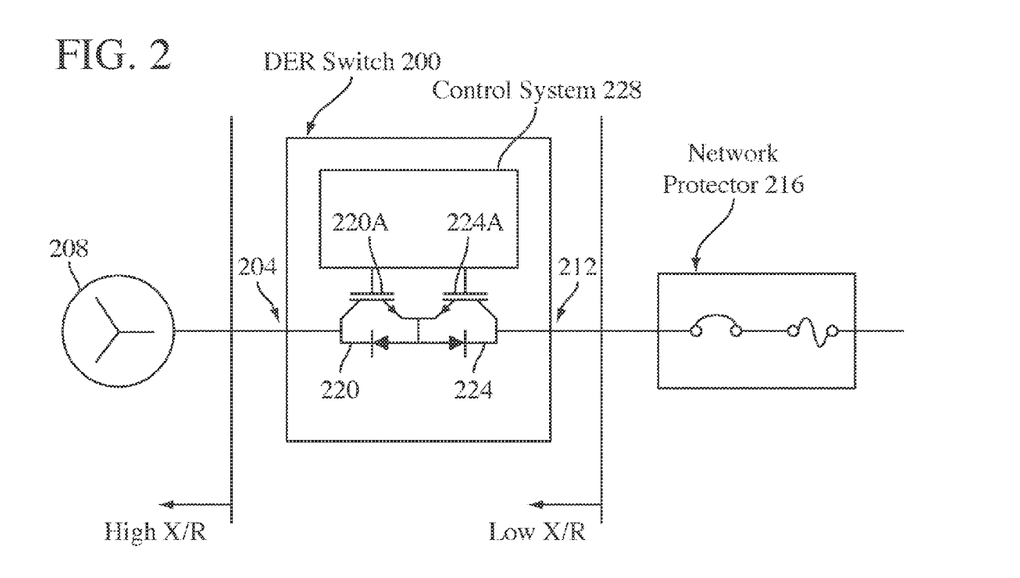
FIG. 2 is a high-level schematic diagram of an interconnection device of the present disclosure electrically coupled between a synchronous generator and a network protection device.

FIG. 2 illustrates an example DER switch 200 that can be used as, or be part of, an interconnection system, such as interconnection system 104 of FIG. 1. As seen in FIG. 2, like DER switch 116 of FIG. 1, DER switch 200 has an input 204 electrically coupled to a DER, here a synchronous generator 208, and an output 212 electrically coupled to a network protector 216. Though not shown in FIG. 2, those skilled in the art will readily appreciate that synchronous generator 208 may also be electrically connected to one or more loads via one or more connections on the DER-switch side of network protector 216. Similarly, those skilled in the art will readily appreciate that network protector 216 may also be electrically connected to a power network such as, for example, utility power network 112 of FIG. 1, or other power network.

DER switch 200 includes one or more semiconductor switches, here, a pair of back-to-back power insulated gate bipolar transistors (IGBTs) 220, 224. (In this example, IGBTs 220, 224 are back-to-back to control the alternating current flowing in both directions through DER switch 200.) It is noted that while DER switch 200 is shown as being based on power IGBTs 220, 224, in other embodiments other suitable semiconductor-based power devices may be used in the DER switch, such as one or more NPN bipolar junction transistors (BJTs), one or more N-channel MOSFETs and one or more static induction transistors (SITs), and any combination thereof and/or with one or more IGBTs. It is also noted that if one or more reverse blocking devices are used, back-to-back series connection of two semiconductor switches (here, IGBTs 220, 224) would not be required.

As mentioned above, an important feature of a DER switch of the present disclosure is that it effectively lowers the X/R of the attached DER to a level that is no greater than the X/R of the network protector to which the DER is connected. Referring to FIG. 2, in this example, synchronous generator 208 has a relatively high X/R, for example, on the order of 20 or more, due to the large value of the sub-transient inductance of the generator. However, the X/R of network protector 216 is several times smaller than the X/R of the synchronous generator. Typical X/Rs for network protectors to which synchronous generator 208 could be attached range from about 5 to about 7. However, other network protectors may have values outside that range. As seen in FIG. 2, DER switch 200 effectively reduces the high X/R at its input 204 (from synchronous generator 208) to a low X/R at its output 212 that is equal to or less than the relatively low X/R of network protector 216. A way in which DER switch 200 accomplishes this is by changing from highly conductive during times of "normal" operation (i.e., when an over-current caused by synchronous generator 208 is not present at input 204) to highly resistive in response to suitably high over-currents caused by the generator. DER switch 200 does this by leveraging certain behavior of semiconductor-based switching devices, such as IGBTs, BJTs, N-channel MOSFETs and SITs, as discussed below in connection with FIG. 3.

Figure 3:
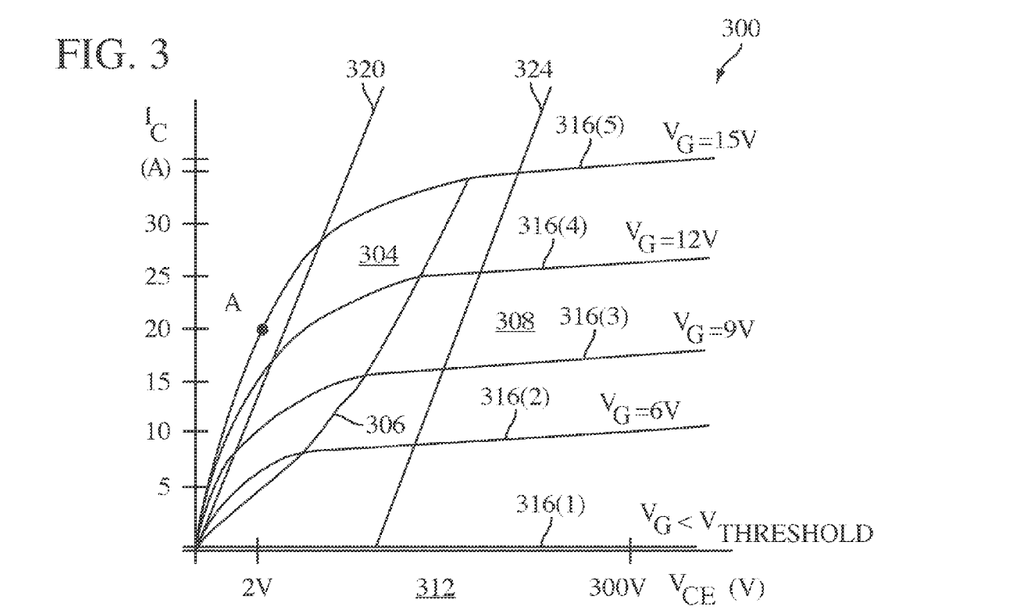
FIG. 3 is a graph of collector current ($I_C$) versus collector-emitter voltage ($V_{CE}$) for various values of gate control voltage ($V_G$) for an example of a semiconductor switch suitable for use in a DER switch of the present disclosure.

Referring now to FIG. 3, and also to FIG. 2, FIG. 3 is an example graph 300 that illustrates the static behavior of an IGBT that contributes to the effective-X/R-reducing capability of a DER switch of the present disclosure, such as DER switch 200 (FIG. 2). Graph 300 is a plot of collector current ($I_C$) versus collector-emitter voltage ($V_{CE}$) for an example power IGBT (not shown). While graph 300 contains some specific values of the voltage applied to the gate of the IGBT (i.e., $V_G$), it should be understood that these values, as well as the particular number and shapes of the plotted curves, are provided simply to illustrate the general behavior of IGBTs and other semiconductor switches to facilitate an explanation of the functioning of a DER switch of the present disclosure, such as DER switch 200 of FIG. 2. Consequently, the reader should not necessarily focus on the specific values and particular number and shapes of the curves shown, but rather the general behavior that they represent. In this example, IGBTs 220, 224 of FIG. 2 each have the behavior depicted in graph 300 of FIG. 3.

Graph 300 has 1) a saturation region 304, i.e., the locus of points wherein the IGBT is operating in a fully saturated state in which the voltage $V_G$ applied to the gate does not substantially affect the collector current $I_C$ (theoretically, the saturation region is bounded on the left by the $I_C/V_{CE}$ curve having the maximum possible $V_G$ and on the right by a "current saturation" boundary approximated in graph 300 by segmented line 306), 2) an active region 308, i.e., the locus of points wherein the collector current $I_C$ is controlled by the gate voltage $V_G$ and 3) a cutoff region 312 wherein the gate voltage $V_G$ is less than the threshold voltage of the IGBT, which is typically in the 3V to 5V range, and no collector current $I_C$ flows regardless of the collector-emitter voltage $V_{CE}$. In this example, graph 300 contains five collector current $I_C$ versus collector-voltage $V_{CE}$ curves 316(1)-316(5) for five corresponding differing values of applied gate voltage $V_G$ that show how the collector current is limited by the applied gate voltage when the IGBT is operating in active region 308. For example, assume that under normal conditions the IGBT represented by graph 300 operates at point A within saturation region 304, where the collector current $I_C$ is 20 amps. Further assume that during a current-fault event the over-current at the input of the IGBT rises to 60 amps. If, in response to this over-current, the IGBT is caused to operate in active region 308, say with an applied gate voltage $V_G$ of 12 volts, the current at the output of the IGBT, i.e., collector current $I_C$, will be no more than about 25 amps as it is constrained to the values of collector current that lie along curve 316(4). Limiting the current passing through the IGBT in this manner during an over-current means that the IGBT effectively acts as a resistor of fairly high resistance during the current fault. The actual effective resistance of the IGBT will depend on its operating point within active region 308.

Relating this to FIG. 2, the increased resistance of IGBTs 220, 224 within DER switch 200 during an over-current modifies the high X/R of synchronous generator 208 seen at input 204 by increasing denominator of X/R (i.e., the resistance term "R"), thereby reducing the value of X/R seen at output 212. As mentioned above relative to graph 300 of FIG. 3, control of the IGBT is needed to cause the IGBT to change from operating in saturation region 304 to operating in active region 308, wherein the collector current $I_C$ can be controlled via gate voltage $V_G$. This control is represented in FIG. 2 by the presence of a control system 228 in electrical communication with corresponding respective gates 220A, 224A of IGBTs 220, 224. At a basic level, control system 228 is configured to change the mode of operation of each of IGBTs 220, 224 between at least a saturation operating mode (i.e., wherein the IGBT operates in saturation region 304 (FIG. 3)) and an active operating mode (i.e., wherein the IGBT operates in active region 308). As described below in more detail, for purposes of heat management when IGBTs 220, 224 are operating in active region 308, control system 228 can also be configured to change the mode of operation of each of the IGBTs to the active operating mode and a cutoff operating mode (i.e., wherein the IGBT operates in cutoff region 312) and/or the saturation operating mode and the cutoff operating mode, as needed to suit a particular design. It is noted for the sake of completeness that while graph 300 of FIG. 3 is directed to an IGBT, and more generally BJTs, it can be modified to represent suitable MOSFETs and SITs by substituting "drain" for "collector" and "source" for "emitter," such that "collector current $I_C$" becomes "drain current ID" and "collector-emitter voltage $V_{CE}$" becomes "drain-source voltage $V_{DS}$". In addition, by plotting base current values in place of the gate voltage values of graph 300, a similar graph can be created for a BJT.

Figure 4:
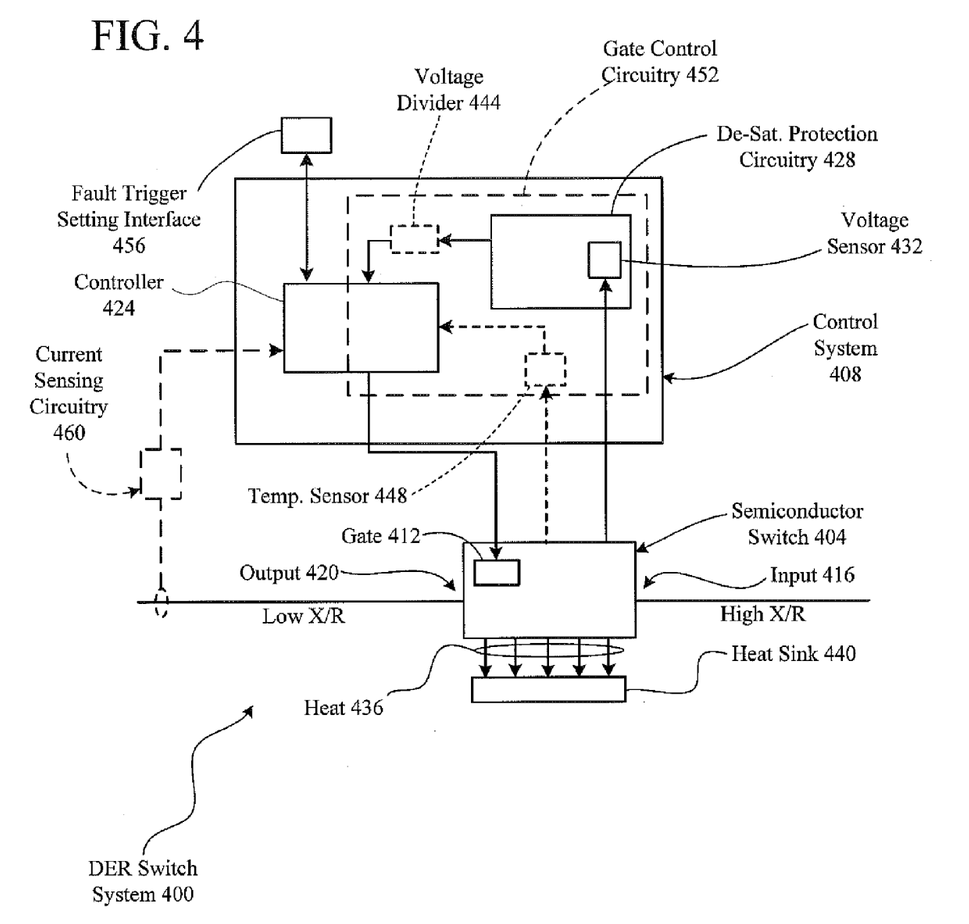
FIG. 4 is a high-level block diagram of a DER switch system made in accordance with broad concepts of the present disclosure.

FIG. 4 illustrates a DER switch system 400, which may be used in a DER switch of the present disclosure, such as either of DER switches 116, 200 of FIGS. 1 and 2, respectively. In this example, DER switch system 400 includes a semiconductor-based switch 404 that is controlled by a control system 408 in a manner that provides the X/R-changing functionality described above in connection with FIGS. 2 and 3. It is noted that only one semiconductor switch 404 is shown for convenience. One or more additional semiconductor switches similar to semiconductor switch 404 can be provided in parallel and/or in series with semiconductor switch 404 as desired to suit a particular design. For example, in the context of DER switch 200 of FIG. 2, a second semiconductor switch (not shown) can be placed in electrical series with, and back-to-back relative to, semiconductor switch 404 so as to provide bidirectional protection, for example, for AC installations. In another example, one or more semiconductor switches can be placed in electrical parallel with semiconductor switch 404 so as to share current among them. If multiple semiconductor switches are provided, all of the switches can be controlled by a common control system. Alternatively, each semiconductor switch can be controlled by a corresponding control system that may or may not communicate with one or more other like control systems and/or a higher-level coordinating controller (not shown). While the configurations of DER switch systems are many and varied, attention is directed to particular DER switch system 400 of FIG. 4, which illustrates a number of broad concepts that can be applied to any of the alternative configurations.

Semiconductor switch 404 includes a voltage-controlled gate 412 and can be any suitable semiconductor switch device, such as any one of the IGBT, BJT, MOSFET and SIT devices noted above. Semiconductor switch 404 has an electrical input 416 and an electrical output 420. When semiconductor switch 404 is in-situ, i.e., electrically coupled between a DER (not shown) having a high X/R and a network protector (not shown) or other device having a low X/R, input 416 has the high X/R of that DER and output 420 is desired to have an X/R at least as low as the X/R of the network protector during an over-current being present on input 416. That low X/R on output 420 is achieved in part as described above, i.e., by causing semiconductor switch 404 to act as a significant resistive element during the over-current.

Control system 408 controls the operation of semiconductor switch 404 so that the switch becomes highly resistive during an over-current fault. Semiconductor switch 404 is selected/designed so that during normal operation of the DER connected to input 416 it operates in its saturation operating mode, for example, within saturation region 304 of FIG. 3. When control system 408 detects an over-current, it causes/allows semiconductor switch 404 to operate in its cutoff operating mode (e.g., within cutoff region 312 of FIG. 3) and/or its active operating mode (e.g., within active region 308 of FIG. 3) for a period of time that varies depending on the overall design of DER switch system 400. As described above, when semiconductor switch 404 is operating in its active operating mode, it is highly resistive in nature and limits the amount of current at output 420. Again, it is the increase in effective resistance of semiconductor switch 404 during over-current that contributes to reducing the high X/R at input 416 to the low X/R at output 420. If/when semiconductor switch 404 is operating in its cutoff operating mode, no current flows to electrical output 420, so any over-current present on electrical input 416 is removed from the electrical output.

Control system 408 includes a controller 424 that generates a control voltage signal that is applied to gate 412 so as to control the on-off state and fault-current limit of semiconductor switch 404. Controller 424 generates the control voltage signal as a function of whether or not an over-current is present at input 416 of semiconductor switch 404, as well as, in this example, whether or not the temperature of the semiconductor switch has reached a certain level. During normal operation, i.e., when no over-current is present at input 416, the temperature of semiconductor switch 404 is at an acceptable level and no other fault is occurring, controller 424 allows the semiconductor switch to operate in its saturation operating mode, wherein the switch is highly conductive. As described below in more detail, controller 424 is also configured such that when an over-current is present on input 416, it allows semiconductor switch 404 to operate in its active mode for a certain amount of time. During the time semiconductor switch 404 is operating in its active mode, it becomes highly resistive and, thereby, effectively lowers the X/R seen at input 416 and lowers the current appearing on output 420. The amount of time semiconductor switch 404 operates in its active mode will vary depending on the particular design of DER switch system 400.

In one example, semiconductor switch 404 is permitted to operate in its active mode (see, e.g., active region 308 of FIG. 3) during an over-current for only a very short period of time. In this connection, many conventional IGBT-based switching devices have de-saturation-protection circuitry that detects when the IGBT has entered into its active operating mode and very shortly thereafter turns the IGBT off by forcing it into its cutoff operating mode (see, e.g., cutoff region 312 of FIG. 3) wherein no current flows through the IGBT. By turning the IGBT off, the IGBT is protected from overheating. For the brief time that such a conventional IGBT-based switching device is operating in its active mode, proper selection of the voltage applied to the gate of the IGBT will cause the IGBT to limit the current at the output of the IGBT as it becomes a relatively high-electrical-resistance device.

Such a conventional IGBT switching device (or another device having such de-saturation protection circuitry) can be used as semiconductor switch 404 of FIG. 4. Consequently, control system 408 is shown as having de-saturation protection circuitry 428 that is designed to send a voltage signal to controller 424, which uses that signal to turn off semiconductor switch 404 very soon after the semiconductor switch has entered into its active operating mode (see, e.g., active region 308 of FIG. 3). In this embodiment, the determination of whether or not semiconductor switch 404 has entered into its active mode of operation is made by monitoring the voltage across the semiconductor switch between input 416 and output 420 using a voltage sensor 432. If semiconductor switch 404 is an IGBT or BJT, this amounts to sensing the collector-emitter voltage $V_{CE}$ (see, e.g., FIG. 3). In this example, controller 424 sends a turnoff signal to gate 412 of semiconductor device 404 when the voltage signal output by de-saturation circuitry 428 reaches a predetermined turnoff threshold that is based on the operating characteristics of the particular semiconductor switch used for semiconductor switch 404. Relating this to FIG. 3, FIG. 3 illustrates a conventional turnoff threshold 320 of conventional de-saturation protection circuitry. As can be seen in FIG. 3, turnoff threshold 320 is fairly low, thereby limiting the amount of time that the corresponding semiconductor switch operates in active region 308 in response to a runaway over-current.

When semiconductor switch 404 is operating in its active mode and is subjected to a high over-current at input 416, it generates a significant amount of heat 436. To deal with this heat in this example, DER switch system 400 includes a heat sink 440 in thermal communication with semiconductor switch 404 so as to draw the excess heat away from the semiconductor switch to the extent practicable. The heat-sinking capacity of heat sink 440 and the over-current expected during a worst-case current fault can influence the design of DER switch system 400.

Continued operation of semiconductor switch 404 in its active region typically requires tremendous heat sinking. However, if semiconductor switch 404 is quickly turned off and on at a sufficiently slow repetition rate, the thermal inertia of the semiconductor switch and heat sink 436 can suffice. The quick disconnecting of the DER (not shown) in this manner is not a problem, but instead is another feature of DER switch system 400 if it is operating in this regime. The problem of a large over-current is eliminated in this case not solely through a larger X/R, but through removal of the source of the over-current, i.e., the DER. Thus, in all cases DER switch system 400 provides over-current protection to the network to which the system is connected. This fast on-off functionality can in many cases be provided by conventional de-saturation protection circuitry 428 working in conjunction with a conventional turnoff threshold, such as turnoff threshold 320 of FIG. 3. In the context of an IGBT-based implementation of DER switch system 400, conventional IGBT de-saturation protection circuitry is typically designed to respond very quickly.

However, in the example shown in FIG. 4, control system 408 also includes an optional voltage divider 444, which is used to modify the voltage signal output by conventional de-saturation protection circuitry 428. In effect, voltage divider 444 desensitizes the cutoff response of control system 408 by dividing the signal output by de-saturation protection circuitry 428 such that the output of the voltage divider is a voltage signal having a voltage lower than the voltage of the voltage signal output by the de-saturation protection circuitry. Consequently, if controller 424 is programmed with the same turnoff threshold voltage, when the voltage signal output by voltage divider 444 reaches that threshold, the voltage signal output by de-saturation protection circuitry 428 is higher than that threshold. Relating this to example graph 300 in FIG. 3, this, in turn, effectively moves conventional turnoff threshold 320 (FIG. 3) to the right relative to FIG. 3, for example, to the modified turnoff threshold 324. Assuming a very high over-current, this altering of the effective turnoff threshold allows semiconductor switch 404 to operate longer in its active mode (e.g., within active region 308 of FIG. 3) and contribute much more X/R-lowering resistance than if conventional turnoff threshold were used. By properly selecting the divisor of voltage divider 444 and selecting/designing a semiconductor switch with the appropriate operating characteristics for use as semiconductor switch 404, a designer can configure DER switch system 400 for a particular installation while still utilizing the typically very fast de-saturation protection circuitry.

As an illustration of the time semiconductor switch 404 would generally operate in its active region (e.g., within active region 308 of FIG. 3) typical conventional IGBT de-saturation protection circuitry is designed for very rapid turn off in the 100 ns regime. However, when an IGBT is used for semiconductor switch 404, control system 408 would typically be designed to turn off the IGBT after a much longer time operating in the active region, for example, ten times longer than conventional de-saturation protection circuitry.

Thus, control system 408 would allow the IGBT to operate in the active region for a time in the micro-second regime. In addition, it is noted that typical IGBTs have on-state voltages of 15 V. Reducing the on-state voltage of an IGBT used for semiconductor switch 404 to a lower levels, for example, 3 V to 5 V, can induce entry in to the active region while reducing power dissipation in the IGBT due to the lower collector-emitter current.

As mentioned above, when semiconductor switch 404 is operating in its active mode (e.g., within active region 308 of FIG. 3) under the influence of a large current, the semiconductor switch generates a tremendous amount of heat. Hence, in this example DER switch system 400 is provided with heat sink 440. The heat-sinking capacity of heat sink 440 relative to the design over-current conditions DER switch system 400 is designed to function under can influence the design of control system 408. For example, if heat sink 440 does not have the capacity to sink enough heat from semiconductor switch 404 to allow the DER (not shown) to remain connected through the semiconductor switch throughout the entire period the over-current is present, DER switch system 400 may need additional thermal protection.

In one example, which is illustrated in the embodiment shown in FIG. 4, controller 424 is configured to generate a turnoff signal in response to the temperature of semiconductor switch 404 reaching a predetermined upper turnoff temperature value. That turnoff signal is provided to gate 412 of semiconductor switch 404 so as to cause the semiconductor switch to operate in its cutoff mode in which current no longer flows through the switch and, so, no additional heat is generated by the switch. Once the temperature of semiconductor switch 404 falls below a predetermined lower turn-on value, controller 424 sends a turn-on signal to gate 412 that allows the semiconductor switch to operate in either its saturation or active mode, as the case may be, depending on whether or not an over-current is still present at input 416 to the switch. In this example, a temperature sensor 448 is provided to sense the temperature of semiconductor switch 404 and provide controller 424 with a suitable temperature signal. Depending on the configuration of DER switch system 400, temperature sensor 448 can directly measure the temperature of semiconductor switch 404 or can indirectly measure the temperature of the semiconductor switch by sensing the temperature of another component of the DER switch known to have a temperature that corresponds in a known manner to the temperature of the switch. This can also be couple with estimation methods, which can be used to predict the temperature of semiconductor switch 404.

If the heat-sinking capacity of heat sink 440 is sufficiently large that it can handle semiconductor switch 404 operating in its active mode for an entire design current-fault condition, control system 408 need not be provided with any thermal protection. Thermal protection similarly need not necessarily be provided if, as mentioned above, semiconductor switch 404 is cycled off and on at a rate sufficient to keep the heating of the switch within check during a design maximum over-current.

Those skilled in the art will readily appreciate that controller 424 can be implemented as an analog device with appropriate circuitry or as a digital device using a suitable digital machine or as a combination digital/analog device, according to the desired design. Skilled artisans would be able to implement controller 424 in any of these manners such that further details beyond the block diagram of FIG. 4 are not necessary. Consequently, specific circuitry/devices that would be needed to execute controller 424, such as analog-to-digital and digital-to-analog converters, comparators, digital signal processors, etc., are not shown.

In this example, voltage sensor 432, de-saturation protection circuitry 428, voltage divider 444 (if provided), temperature sensor 448 (if provided) and those portions of controller 424 that function in controlling gate 412 of semiconductor switch 404 can be considered part of overall gate control circuitry 452. In this connection, the portions of controller 424 not part of gate control circuitry 452 can provide other functionality, such as storing information (e.g., in a digital context) or containing circuitry (e.g., in an analog context) that sets the operating parameters of DER switch system 400. For example, those portions of controller 424 outside gate control circuitry 452 can be used for setting a threshold value for triggering semiconductor switch 404 to operate in its active operating mode so as to suit a particular application. In such an embodiment, DER switch system 400 could include a fault trigger setting interface 456 that allows a user to adjust the threshold value. Those skilled in the art would understand how to implement fault trigger setting interface 456 such that further explanation in this disclosure is not necessary.

While DER switch system 400 shown is generally described above as being based on modifying an off-the-shelf IGBT-based semiconductor switch device by adding voltage divider 444 so as to "trick" the device to operate in its active mode, those skilled in the art will readily appreciate that in alternative embodiments de-saturation protection circuitry 428, voltage divider 444 and/or controller 424 can be replaced by custom voltage-control circuitry (not shown) that achieves the desired result of allowing semiconductor switch 404 to operate in its active mode when the voltage sensed by voltage sensor 432, such as the current-emitter voltage $V_{CE}$ in an IGBT, indicates that an over-current is present on input 416. In other alternative embodiments that include generally conventional de-saturation protection circuitry 428, voltage divider 444 can be eliminated and controller provided/programmed with a turnoff threshold that is higher than the corresponding conventional turnoff threshold. Relating this to example graph 300 of FIG. 3, controller 424 would be programmed with modified turnoff threshold 324 rather than conventional turnoff threshold 320.

In further embodiments, DER switch system 400 could include current-sensing circuitry 460 for directly sensing the current at output 420 of semiconductor switch 404. In this example, current-sensing circuitry 460 inputs the value of the measured current into controller 424, which is configured/programmed to compare the measured current to a present over-current threshold value so as to determine in which mode (saturation, active, or cutoff) semiconductor switch 404 should be operating. If current-sensing circuitry 460 is provided and controller 424 is responsive to a measured current as just described, de-saturation circuitry 428, voltage sensor 432 and voltage divider 444 could be eliminated. Using current-sensing circuitry 460 would remove the device-to-device variation in the relationship between the gate voltage $V_G$ and collector-emitter voltage $V_{CE}$. It would also allow for the dynamic regulation of the maximum current through semiconductor switch 404. This would typically require heat sink 440 to have a large heat-sinking capacity for extended operation of semiconductor switch 404 in the current regulation mode, i.e., operation in the semiconductor switch's active mode.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An interconnection device for connecting a distributed energy resource (DER) having a first reactance-to-resistance ratio (X/R) to an electrical power system (EPS) via an EPS protector having a second X/R lower than the first X/R, the interconnection device comprising:
a DER switch that includes:
an input for receiving power from the DER when the interconnection device is installed between the DER and the EPS protector and the DER is operating;
an output for providing, when said DER switch is closed, the DER is operating, and the interconnection device is installed between the DER and the EPS protector, the power to the EPS protector; and
a switching device electrically connected between said input and said output, said switching device responsive to, when the interconnection device is installed between the DER and the EPS, an over-current from the DER so as to provide at said output a non-zero third X/R that is no greater than the second X/R.

2. The interconnection device according to claim 1, wherein said switching device comprises a semiconductor switch operatable in a saturation operating mode and an active operating mode, said semiconductor switch configured to operate in the saturation operating mode during normal operation and operate in the active operating mode during the over-current, the active operating mode providing said semiconductor switch device with an intentionally increased electrical resistance during the over-current so as to effectively reduce the first X/R to the non-zero third X/R.

3. The interconnection device according to claim 2, wherein said switching device comprises two semiconductor switches electrically connected so as to control current in two opposing directions.

4. The interconnection device according to claim 3, wherein said switching device comprises two back-to-back insulated-gate bipolar transistors.

5. The interconnection device according to claim 2, wherein said DER switch further includes a controller in electrical communication with said semiconductor switch, said controller configured to allow said semiconductor switch to operate in the active operating mode so as to pass current during the over-current.

6. The interconnection device according to claim 5, wherein said controller is configured to pulse said semiconductor switch off in response to the over-current and to turn said semiconductor switch on after the over-current clears.

7. The interconnection device according to claim 6, further comprising a heat sink and a temperature sensor, said heat sink thermally coupled with said semiconductor switch for sinking heat therefrom when said semiconductor switch is operating, said temperature sensor for measuring a temperature of heat generated by said semiconductor-switching device, wherein said controller is configured to turn off and on said semiconductor switch as a function of the temperature.

8. The interconnection device according to claim 5, wherein said semiconductor switch includes a gate and said controller including gate-control circuitry in electrical communication with said gate and configured to allow said semiconductor switch to operate in the active operating mode during the over-current.

9. The interconnection device according to claim 8, wherein said semiconductor switch has a collector-emitter voltage and said gate-control circuitry is configured to control the semiconductor switch as a function of the collector-emitter voltage.

10. The interconnection device according to claim 9, wherein said gate-control circuitry includes conventional de-saturation protection circuitry designed to inhibit said semiconductor switch from exiting the saturation operating mode, said gate control circuitry further including a voltage divider located between said semiconductor switch and said gate-control circuitry, said voltage divider provided to alter functioning of said conventional de-saturation protection circuitry to allow said semiconductor switch to operate in the active operating mode.

11. The interconnection device according to claim 5, wherein said semiconductor switch has a current-limiting response and said controller includes response-selection circuitry that permits tuning of said current-limiting response.

12. The interconnection device according to claim 11, wherein said controller includes feedback circuitry for automatically controlling said current-limiting response.

13. The interconnection device according to claim 12, wherein said DER switch includes a current sensor for sensing current at said input, said feedback circuitry controlling aid current-limiting response as a function of the current detected by said current sensor.

14. A system, comprising:
a distributed energy resource (DER) having a first reactance-to-resistance ratio (X/R);
an electrical power system that includes a power protector having a second X/R smaller than said first X/R;
a DER switch that includes:
an input for receiving power from said DER;
an output for providing the power to said power protector; and
a switching device electrically connected between said input and said output, said switching device responsive to an over-current from said DER so as to provide at said output a non-zero third X/R that is no greater than said second X/R.

15. The system according to claim 14, wherein said DER comprises a rotating machine electrical power generator.

16. The system according to claim 14, wherein said electrical power system comprises a utility power grid.

17. The system according to claim 14, wherein said switching device comprises a semiconductor switch having a saturation operating mode and an active operating mode, said semiconductor switch operating in the saturation operating mode during normal operation and operating in the active operating mode during the over-current, the active operating mode increasing resistance of the semiconductor switch during the over-current so as to effectively reduce the first X/R to the non-zero third X/R.

18. The system according to claim 17, wherein said switching device comprises two semiconductor switches electrically connected so as to control current in two opposing directions.

19. The system according to claim 18, wherein said switching device comprises two back-to-back insulated-gate bipolar transistors.

20. The system according to claim 17, wherein said DER switch further includes a controller in electrical communication with said semiconductor switch, said controller configured to allow said semiconductor switch to operate in the active operating mode so as to pass current during the over-current.

21. The system according to claim 20, wherein said controller is configured to pulse said semiconductor switch off and on when said semiconductor switch is in the active operating mode.

22. The system according to claim 21, further comprising a heat sink and a temperature sensor, said heat sink thermally coupled with said semiconductor switch for sinking heat therefrom when said semiconductor switch is operating in the active operating mode, said temperature sensor for measuring a temperature of heat generated by said semiconductor-switching device, wherein said controller is configured to control operation of said semiconductor switch as a function of the temperature.

23. The system according to claim 20, wherein said semiconductor switch includes a gate and said controller including gate-control circuitry in electrical communication with said gate and configured to allow said semiconductor switch to operate in the active operating mode during the over-current.

24. The system according to claim 23, wherein said semiconductor switch has a collector-emitter voltage and said gate-control circuitry is configured to control the semiconductor switch as a function of the collector-emitter voltage.

25. The system according to claim 24, wherein said gate-control circuitry includes conventional de-saturation protection circuitry designed to keep said semiconductor switch from entering the active operating mode, said gate control circuitry further including a voltage divider located between said semiconductor switch and said gate-control circuitry, said voltage divider provided to alter functioning of said conventional de-saturation protection circuitry to allow said semiconductor switch to operate in the active operating mode.

26. The system according to claim 20, wherein said semiconductor switch has a current-limiting response and said controller includes response-selection circuitry that permits tuning of said current-limiting response.

27. The system according to claim 26, wherein said controller includes feedback circuitry for automatically controlling said current-limiting response.

28. The system according to claim 27, wherein said DER switch includes a current sensor for sensing current at said input, said feedback circuitry controlling aid current-limiting response as a function of the current detected by said current sensor.

29. A method of controlling electrical power provided by a distributed energy resource (DER) to an electrical power system, wherein the DER has a first reactance-to-resistance ratio (X/R) and the power protector has a second X/R less than the first X/R, the method comprising:
receiving electrical current from the DER;
while the electrical current is in a non-over-current condition, passing substantially all of the electrical current to the electrical power system; and
when the electrical current is in an over-current condition, effectively reducing, at a location between the DER and the electrical power system, the first X/R to a non-zero value no greater than the second X/R.

30. The method according to claim 29, wherein said passing substantially all of the electrical current is accomplished by operating a semiconductor switch in a saturation operating mode and said effective reducing of the first X/R being accomplished by allowing the semiconductor switch to operate in an active operating mode.

31. The method according to claim 30, wherein said effectively reducing the first X/R includes rapidly switching the semiconductor switch off and on while the semiconductor switch is operating in the active operating mode.

32. The method according to claim 31, further comprising sensing a temperature of heat generated by the semiconductor switch and said rapid switching is controlled as a function of the temperature.

33. The method according to claim 30, further comprising sensing a current entering the semiconductor switch and controlling performance of the semiconductor switch as a function of the current.

34. The method according to claim 33, wherein said controlling of the performance of the semiconductor switch includes controlling a voltage applied to a gate of the semiconductor switch.

35. The method according to claim 30, wherein the semiconductor switch includes a de-saturation protection circuit designed to keep the semiconductor switch operating in the saturation region in response to a collector voltage of the semiconductor switch, said allowing of the semiconductor switch to operate in the active operating mode including reducing the collector voltage seen by the de-saturation protection circuit.

* * * * *